United States Patent [19]

Mathews

[11] 3,831,357
[45] Aug. 27, 1974

[54] RELEASABLE BLADE HOLDER FOR FLAIL MOWER

[76] Inventor: Bernard C. Mathews, P.O. Box 70, Crystal Lake, Ill. 60014

[22] Filed: Sept. 14, 1973

[21] Appl. No.: 397,412

Related U.S. Application Data

[63] Continuation-in-part of Ser. No. 383,996, July 30, 1973.

[52] U.S. Cl. ............................................... 56/294
[51] Int. Cl. ........................................... A01d 55/22
[58] Field of Search ..................... 56/294, 249, 12.7

[56] References Cited
UNITED STATES PATENTS

| 3,111,996 | 11/1963 | Ertsgaard | 172/42 |
| 3,177,640 | 4/1965 | Mott, Jr. | 56/294 |
| 3,604,188 | 9/1971 | Mott | 56/294 |
| 3,645,076 | 2/1972 | Aldred | 56/294 |
| 3,693,335 | 9/1972 | Mathews | 56/294 |

Primary Examiner—Russell R. Kinsey
Attorney, Agent, or Firm—Bayard Jones

[57] ABSTRACT

The rotor drum has sleeve type mounts secured to its surface. A blade hanger connects the blades to each sleeve type mount. The blade hanger has a long straight shank received within the sleeve and a partially closed link portion terminating in a free end. The link shank slides within the sleeve between a normal position and a release position. In the normal position, the free end is closely spaced from the outer surface of the sleeve to prevent removal of a blade from the link portion. In the release position, the free end is laterally offset from the sleeve to permit blade removal. A coil spring surrounding the shank biases the link into its normal position. A nut at the remote end of the shank prevents removal of the shank from the sleeve.

6 Claims, 5 Drawing Figures

PATENTED AUG 27 1974        3,831,357
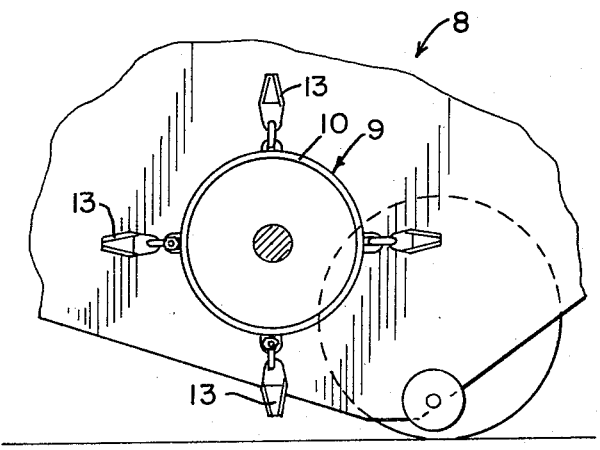
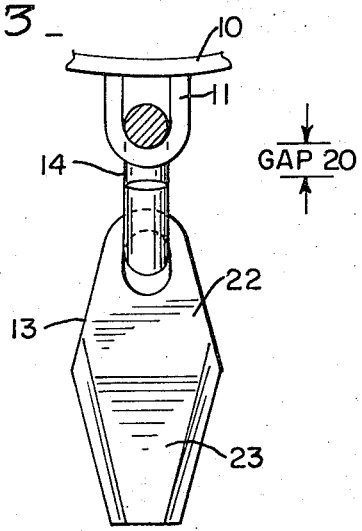
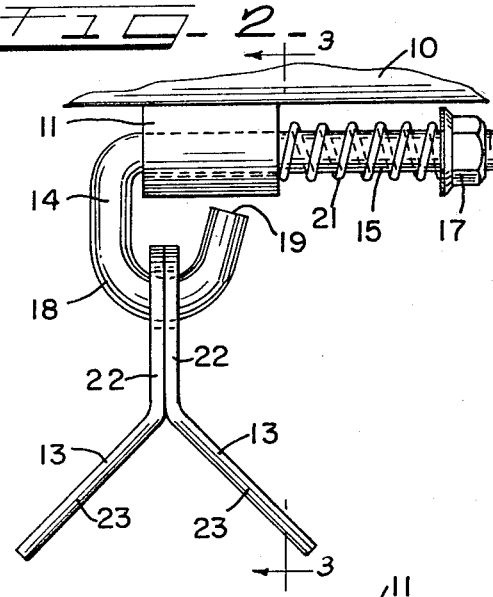
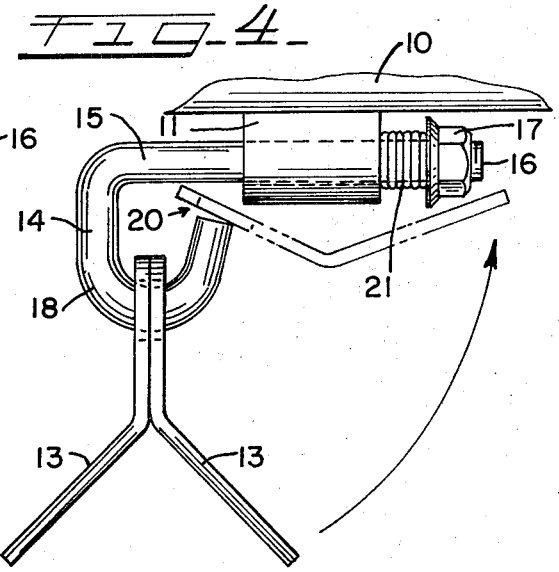
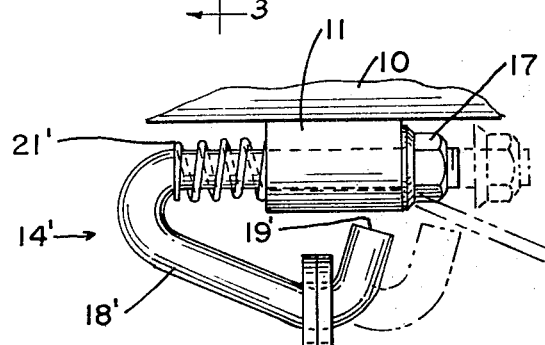

RELEASABLE BLADE HOLDER FOR FLAIL MOWER

This application is a continuation-in-part of my copending Application Ser. No. 383,996, filed July, 30, 1973.

This invention relates to a releasable blade holder for the blades of a flail mower.

The aforesaid copending application discloses a blade assembly comprising two blades and a link or hanger. The link has a straight shank which is received within a loop or sleeve type mount on the rotor and secured by a nut. The blade assembly as a whole is removed by unscrewing the nut, and after removal the blades may be separated from the link. The nut is a type of locknut.

The object of the present invention is to provide an arrangement in which the blade can be removed quickly without removing the nut.

According to the present invention, that which is mounted in the loop or sleeve type mount on the rotor is a blade hanger having a long shank so that the shank can be axially shifted between two extreme positions, one in which the blade is blocked against removal and the other in which it is not blocked so as to permit removal. A coil spring on the shank urges the blade hanger into the blocked position.

Other objects, features and advantages will become apparent as the description proceeds.

In the drawings:

FIG. 1 is a fragmentary sectional view of a flail mower showing the rotor and its blades;

FIG. 2 is an enlarged front elevation of a blade holder embodying my invention;

FIG. 3 is a side section taken along line 3—3 of FIG. 2;

FIG. 4 is a view similar to FIG. 2 but showing the parts in a changed position;

FIG. 5 is a front elevation of a modification with a changed position of the parts being shown in broken lines.

FIG. 1 shows a flail mower 8 which includes a rotor 9 having blades 13. The rotor 9 includes a tubular member or drum 10 having on its surface a plurality of loop or sleeve type mounts 11 arranged in four rows. Each mount is in the form of a U-shaped metal strip welded to the rotor surface and providing a sleeve-like structure for receiving the shank 15 of a blade hanger 14.

The hanger 14 is shaped from circular rod stock and includes a curved link portion 18 providing a partially closed loop, the free end 19 of the link portion being spaced from the shank portion to provide a gap 20. The gap 20 is wider than the thickness of either blade 13 so that the blades may be removably mounted on the link portion 18.

The remote end of the shank 15 is threaded at 16 and receives a nut 17 which confines the shank 15 within the sleeve 11. The shank 15 is much longer than the axial length of the sleeve 11, more than twice as long in the FIG. 2 embodiment, so as to permit the shank to slide within the sleeve to provide two positions for the hanger 14, shown in FIGS. 2 and 4 respectively. In the FIG. 2 position, the normal position, the clearance between the free end 19 and the surface of the sleeve 11 is less than the thickness of the blade 13, thus preventing removal when the blade is swung up to a position corresponding to the dotted-line position of FIG. 4.

In the FIG. 4 position, the release position, the free end 19 of the link portion is laterally offset away from the end of the sleeve 11. Here, the full width of the gap 20 is exposed. In this position of the parts, a blade can be moved up into the dotted-line position and unhooked from the link portion 18.

A coil spring 21 is mounted on the shank 15 and confined between the end surface of the sleeve 11 and the nut 17 to urge the hanger 14 into the normal position of FIG. 2, but to permit displacement thereof against the spring bias into the release position of FIG. 4.

In the modification of FIG. 5, the hanger 14' provides a link portion 18' which is longer than the link portion 18 of FIG. 2. Here the spring 21' is confined between the sleeve 11 and the beginning of the link portion 18'. Thus the normal or blocked position of the parts is the solid line position.

When the hanger 14' is shifted to the right against the bias of the spring 21 and into the broken line position then the free end 19' of the link portion 18' is offset away from the right end of the sleeve 11. Here, the full width of the gap 20' is available to permit manipulation of the blade into a position in which it may be removed over the free end 19'.

In the embodiment shown, the blades 13 are "slide slicer" type blades and are mounted on the hangers 14 in pairs. Each blade 13 comprises an apertured shank portion 22 and a cutting portion 23 disposed at an angle to each other. The edges of the cutting portion 23 are sharpened to provide cutting edges. These blades are described in greater detail in my aforesaid copending application to which reference is hereby made.

However, my invention is equally applicable to other types of blades in which the cutting portion is arranged somewhat differently with respect to the shank to provide cutting edges extending at entirely different angles, such as perpendicular, to the plane of the shank. In some types, only a single blade will be mounted on each hanger.

The nut 17 is preferably a clinch nut, which is a type of locknut, but a confining means which is less easily removed can be provided if desired.

The subject matter of the aforesaid copending Application Ser. No. 383,996 is incorporated herein by reference, insofar as consistent with the present disclosure.

Although only preferred embodiments of my invention are shown and described herein, it will be understood that various modifications and changes can be made in the constructions shown without departing from the spirit of my invention as pointed out in the appended claims.

I claim:

1. A releasable blade holder for a flail mower having a rotor drum comprising means providing a sleeve type mount secured to the surface of said drum, a hanger having a straight shank received within said sleeve type mount, means at the remote end of said shank confining said shank within said sleeve type mount, said hanger including a link portion providing a partially closed loop for removably supporting a blade and terminating in a free end, a blade loosely mounted on said link portion, said shank being substantially longer than said sleeve to permit axial movement of said shank between a normal position and a release position, spring means biasing said shank into its normal position, said free end of said link portion being closely spaced from the surface of said sleeve type mount when said shank is in its normal position to prevent removal of said blade from said link portion, said free end being laterally offset away from the end of said sleeve type mount when said shank is displaced into its release position to permit removal of said blade from said link portion.

2. A releasable blade holder as claimed in claim 1 in which said spring means is a coil spring surrounding said shank.

3. A releasable blade holder as claimed in claim 2 in which said coil spring is located between said confining means and said sleeve type mount.

4. A releasable blade holder as claimed in claim 2 in which said coil spring is located between said link portion and said sleeve type mount.

5. A releasable blade holder as claimed in claim 1 in which said remote end of said shank is threaded, and said confining means is a clinch nut.

6. In a flail mower having a rotor drum providing a sleeve type mount on its drum surface, a releasable blade holder for the blades of said rotor comprising a hanger of rod stock shaped to provide a straight shank and a curved link portion, said shank being received within said sleeve type mount, means at the remote end of said shank confining said shank within said sleeve type mount, said link portion providing a partially closed loop for removably supporting a blade and terminating in a free end, said shank being substantially longer than said sleeve type mount to permit axial movement of said shank between a normal position and a release position, spring means biasing said shank into its normal position, said free end of said link portion being closely spaced from the surface of said sleeve type mount when said shank is in its normal position to prevent removal of said blade from said link portion, said free end being laterally offset away from the end of said sleeve type mount when said shank is displaced into its release position to permit removal of said blade from said link portion.

* * * * *